(12) United States Patent
Goto (10) Patent No.: US 9,190,691 B2
(45) Date of Patent: Nov. 17, 2015

(54) FUEL CELL STACK (75) Inventor: Sogo Goto, Aichi-ken (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 307 days.

(21) Appl. No.: 13/500,734

(22) PCT Filed: Oct. 15, 2009

(86) PCT No.: PCT/JP2009/005386
§ 371 (c)(1),
(2), (4) Date: Apr. 6, 2012

(87) PCT Pub. No.: WO2011/045839
PCT Pub. Date: Apr. 21, 2011

(65) Prior Publication Data
US 2012/0196203 A1 Aug. 2, 2012

(51) Int. Cl.
H01M 8/24 (2006.01)
H01M 8/02 (2006.01)

(52) U.S. Cl.
CPC ............ *H01M 8/241* (2013.01); *H01M 8/0267* (2013.01); *H01M 8/2465* (2013.01); *Y02E 60/50* (2013.01)

(58) Field of Classification Search
CPC . H01M 8/241; H01M 8/2425; H01M 8/2475; H01M 8/0202; H01M 8/04082; H01M 8/04089
USPC .......................... 429/454, 452, 457, 471, 455
See application file for complete search history.

(56) References Cited

U.S. PATENT DOCUMENTS

2004/0115513 A1  6/2004  Yang
2006/0024559 A1  2/2006  Benthem et al.
2010/0273076 A1  10/2010 Kunitake

FOREIGN PATENT DOCUMENTS

DE   11 2005 001 754    5/2007
DE   11 2008 003 285    1/2011
(Continued)

OTHER PUBLICATIONS

International Preliminary Report on Patentability for PCT/JP2009/005386 filed Oct. 15, 2009.
(Continued)

*Primary Examiner* — Patrick Ryan
*Assistant Examiner* — Angela Martin
(74) *Attorney, Agent, or Firm* — Finnegan, Henderson, Farabow, Garrett & Dunner, LLP (57) ABSTRACT

A fuel cell stack is equipped with a stacked body constituted by stacking a plurality of power generating elements, which contain an electrolytic membrane and electrocatalytic layers arranged at both surfaces of the electrolytic membrane, via a separator for providing a flow path for supplying reaction gas to the electrocatalytic layer, and collector plates arranged at both ends of the stacked body, for collecting electricity generated by the stacked body and outputting it to the outside, wherein on the separator and the collector plate are formed at least one of an anode exhaust gas exhaust hole for exhausting anode exhaust gas, a cathode exhaust gas exhaust hole for exhausting cathode exhaust gas, and a medium supply hole for supplying into the stacked body a medium for maintaining the temperature of the stacked body at an approximately fixed level, and at the anode side collector plate arranged at the anode side end of the stacked body, an output terminal for outputting at least part of the collected electricity to the outside is provided in the vicinity of at least one of the anode exhaust gas exhaust hole, the cathode exhaust gas exhaust hole, and the medium supply hole.

3 Claims, 6 Drawing Sheets

(56) References Cited

FOREIGN PATENT DOCUMENTS

| | | | | |
|---|---|---|---|---|
| JP | 8-306380 | | 11/1996 | |
| JP | 2004-186132 | | 7/2004 | |
| JP | 2004-362943 | * | 12/2004 | .............. H01M 8/24 |
| JP | 2005-158431 | * | 6/2005 | .............. H01M 8/06 |
| JP | 2005-327558 | | 11/2005 | |
| JP | 2006-73340 | * | 3/2006 | .............. H01M 8/04 |
| JP | 2007-26695 | | 2/2007 | |
| JP | 2009-117221 | | 5/2009 | |
| JP | 2009-218092 | | 9/2009 | |
| WO | WO 2009/071968 | * | 6/2009 | |

OTHER PUBLICATIONS

International Search Report in International Application No. PCT/JP2009/005386; Mailing Date: Jan. 12, 2010.

* cited by examiner

FUEL CELL STACK

TECHNICAL FIELD

The present invention relates to a fuel cell stack having a constitution for which a plurality of single cells are stacked.

BACKGROUND ART

A fuel stack is normally constituted as a stacked body for which are stacked a plurality of single cells which contain a power generating element, which contains electrocatalytic layers arranged on both surfaces of the electrolytic membrane and electrolytic membrane, as well as a separator. With this fuel cell stack, at both ends of the stacked body are stacked in order a collector plate, an insulation plate, and an end plate, and the stacked state is maintained by fastening the pair of end plates using a fastener member. The end plates do not emit heat because they do not generate power, and also a large portion is in contact with air, so the heat dissipates even during operation of the fuel cell, so cooling occurs naturally. Because of that, a number of single cells positioned at the end part of the stacked body are cooled by heat conduction, and there was the problem that flooding occurred.

For this kind of problem, technology that smoothes the temperature distribution of the fuel cell stack using a heater during operation of the fuel cell stack has been proposed (see Patent Reference 1, for example).

CITATION LIST

Patent Literature

Patent Reference 1: JP-A-H08-306380
Patent Reference 2: JP-A-2005-158431

SUMMARY

Problem the Invention Attempts to Solve

However, when using a constitution which provides a heater, there was the problem that the overall dimensions of the fuel cell stack become larger. Because of that, there was a desire to suppress flooding while suppressing the increasing size of the fuel cell stack.

Means for Solving the Problem

The present invention was created to address the problem described above at in least part, and can be realized as the following modes or aspects.

[Aspect 1] A fuel cell stack comprising:

a stacked body constituted by stacking a plurality of power generating elements, which contain an electrolytic membrane and electrocatalytic layers arranged at both surfaces of the electrolytic membrane, via a separator for providing a flow path for supplying reaction gas to the electrocatalytic layer, and collector plates arranged at both ends of the stacked body, for collecting electricity generated by the stacked body and outputting it to the outside, wherein on the separator and the collector plate are formed at least one of an anode exhaust gas exhaust hole for exhausting anode exhaust gas, a cathode exhaust gas exhaust hole for exhausting cathode exhaust gas, and a medium supply hole for supplying into the stacked body a medium for maintaining the temperature of the stacked body at an approximately fixed level, and at the anode side collector plate arranged at the anode side end of the stacked body, an output terminal for outputting at least part of the collected electricity to the outside is provided in the vicinity of at least one of the anode exhaust gas exhaust hole, the cathode exhaust gas exhaust hole, and the medium supply hole.

Flooding may occur near the cathode exhaust gas exhaust hole, the anode exhaust gas exhaust hole, and the medium supply hole. In particular, the degradation of the catalyst may result from flooding at the anode side. The output terminal emits heat due to electric resistance when outputting electricity. Therefore, with the anode side collector plate, by providing an output terminal near at least one of the cathode exhaust gas exhaust hole, the anode exhaust gas exhaust hole, and the medium supply hole, it is possible to heat the part at which flooding occurs easily, and to suppress flooding. By arranging in this way, it is possible to suppress flooding while suppressing the increased size to of the fuel cell stack.

[Aspect 2] A fuel cell according to application example 1 wherein with the anode side collector plate, the electrical resistance per unit of length near the output terminal is in part greater than that of the remaining part.

By arranging in this way, the heat emission volume at the part for which flooding occurs easily becomes greater, so it is possible to suppress flooding more successfully.

[Aspect 3] A fuel cell according to application example 2 wherein by forming the plate thickness near the output terminal to be in part thinner than the remaining part, the electrical resistance per unit of length becomes greater.

By arranging in this way, it is possible to easily increase the electrical resistance.

Note that the present invention can be realized in various modes, and for example can be realized in a mode as a fuel cell system equipped with the fuel cell stack noted above, or a vehicle equipped with that fuel cell system or the like.

MODES FOR CARRYING OUT THE INVENTION

A. First Embodiment

A1. Fuel Cell Stack Constitution

Figure 1:
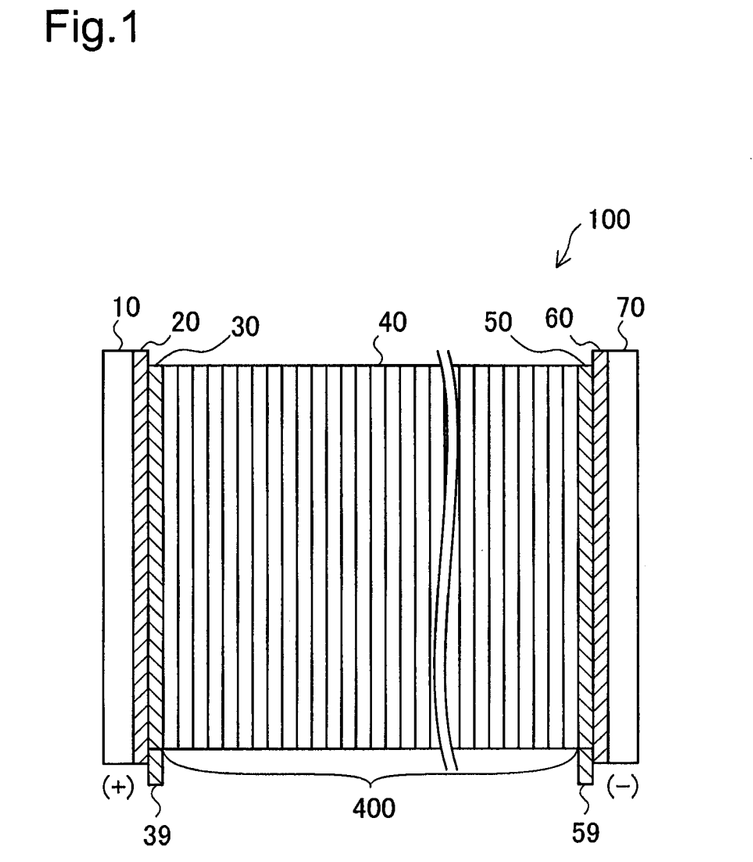
FIG. 1 is a plan view showing the schematic structure of a fuel cell stack as a first embodiment of the present invention.

FIG. 1 is a plan view showing the schematic structure of a fuel cell stack 100 as a first embodiment of the present invention. The fuel cell stack 100 is a solid polymer type fuel cell for performing power generating using air as an oxidation gas and hydrogen as a fuel gas. The fuel cell stack 100 has a stacked body 400 for which are stacked a plurality of single cells 40 constituted with a sealing member single unit type MEA sandwiched by separators. Then, an anode side collector plate 30, an insulation plate 20, and an end plate 10 are stacked on the anode side end of the stacked body, and a cathode side collector plate 50, an insulation plate 60, and an end plate 70 are similarly stacked on the cathode side end. The fuel cell stack 100 is fastened and kept in a state with a specified pressure applied in the stacking direction using a tension plate or the like, though this is not illustrated. The number of single cell 40 stacking layers can be freely set according to the output required at the fuel cell stack 100. Note that in FIG. 1, of the plurality of singe cells 40 arranged between the anode side collector plate 30 and the cathode side collector plate 50, a code number is given to one unit and is omitted for the remainder.

Provided on the fuel cell stack 100 piercing through in the stacking direction of the fuel cell stack 100 are an anode gas supply manifold, an anode exhaust gas exhaust manifold, a cathode gas supply manifold, a cathode exhaust gas exhaust manifold, a cooling water supply manifold, and a cooling water exhaust manifold. These manifolds are constituted by stacking the aforementioned sealing member single unit type MEA, separators, end plates 10 and 70, insulation plates 20 and 60, anode side collector plate 30, and cathode side collector plate 50, and by providing through holes respectively in each of these. With this embodiment, as a cooling medium, cooling water is used, it is also possible to use another cooling medium such as ethylene glycol, propylene glycol or the like.

To ensure rigidity, the end plates 10 and 70 are formed using a metal such as copper or the like. Stainless steel is used for the anode side collector plate 30 and the cathode side collector plate 50, instead of stainless steel, it is also possible to use other metals such as titanium, aluminum or the like, or a gas impermeable conductive member such as fine carbon or the like. The insulation plates 20 and 60 are formed using an insulation member such as rubber, resin, or the like. Output terminals 39 and 59 are respectively provided on the anode side collector plates 30 and 50, making it possible to output the power generated by the fuel cell stack 100.

Figure 2:
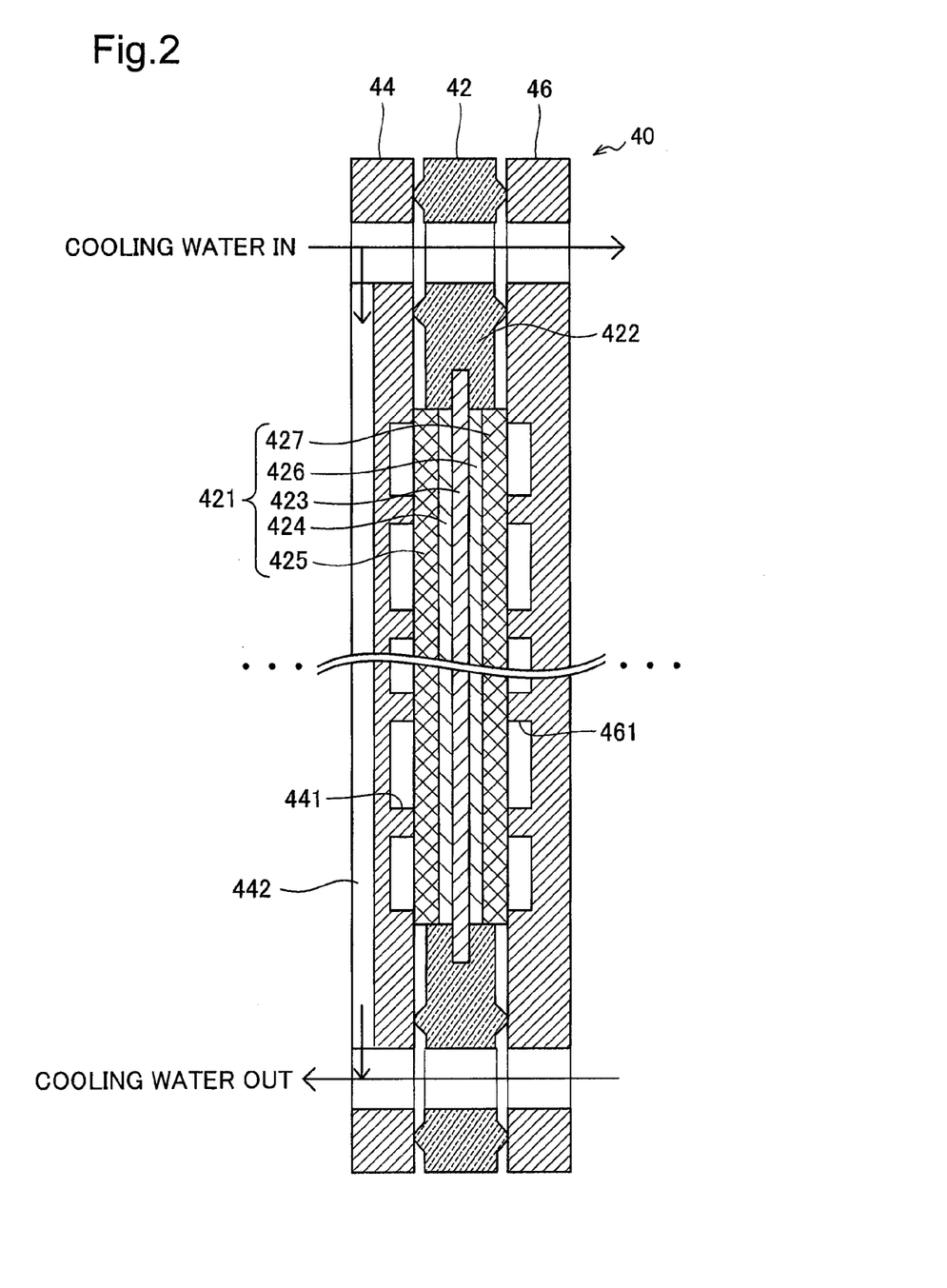
FIG. 2 is an explanatory drawing schematically showing the cross section structure of a single cell.

FIG. 2 is an explanatory drawing schematically showing the cross section structure of a single cell 40. The single cell 40 has an anode side separator 44 and a cathode side separator 46 respectively arranged at both surfaces of a sealing member single unit type MEA 42.

The sealing member single unit type MEA 42 has a frame shaped sealing member 422 formed as a single unit with an MEA 421 on the outer circumference of the MEA 421 for which the outer shape is a roughly rectangular shape. The MEA 421 is constituted by stacking in order an anode 424 and an anode side diffusion layer 425 on one surface of an electrolytic membrane 423, and stacking in order a cathode 426 and a cathode side diffusion layer 427 on the other surface.

With this embodiment, a polyelectrolyte membrane formed using a fluorine resin is used as the electrolytic membrane 423. As the anode 424 and the cathode 426, electrodes formed from a carbon carrier supporting platinum and a platinum alloy as a catalyst are used. As the anode side diffusion layer 425 and the cathode side diffusion layer 427, water repellent processed carbon felt is used. With this embodiment, to increase the drainage, water repellent processing is implemented on the anode side diffusion layers 425 and 216c, it is also possible to use a constitution for which water repellent processing is not implemented. The sealing member 422 is formed with an injection mold using silicone rubber. The material of each part constituting the sealing member single unit type MEA 42 is not limited to that in this embodiment, and it is possible to use various types of known materials.

Formed on the surface abutting the anode side diffusion layer 425 of the anode side separator 44 is an anode gas flow path 441 for distributing and flowing anode gas in the surface direction of the anode side diffusion layer 425, and formed on the other side is a cooling water flow path 442 for flowing cooling water. Meanwhile, formed on the surface abutting the cathode side diffusion layer 427 of the cathode side separator 46 is a cathode gas flow path 461 for distributing and flowing cathode gas in the surface direction of the cathode side diffusion layer 427. With this embodiment, stainless steel is used for the anode side separator 44 and the cathode side separator 46. The separator material is not limited to that in this embodiment, and it is also possible to use other metals such as titanium, aluminum or the like, a gas impermeable conductive member such as fine carbon or the like.

Note that the constitution of the separator is not limited to that in to this embodiment, and it is possible to use separators of various constitutions. For example, it is also possible to use a constitution for which the anode gas flow path and the cathode gas flow path are respectively formed on both surfaces of one separator. It is also possible to use a porous body as the gas flow path and to use a three-layer constitution separator equipped with a smooth surface facing opposite the porous body and equipped with a cooling water flow path on the interior.

Figure 3:
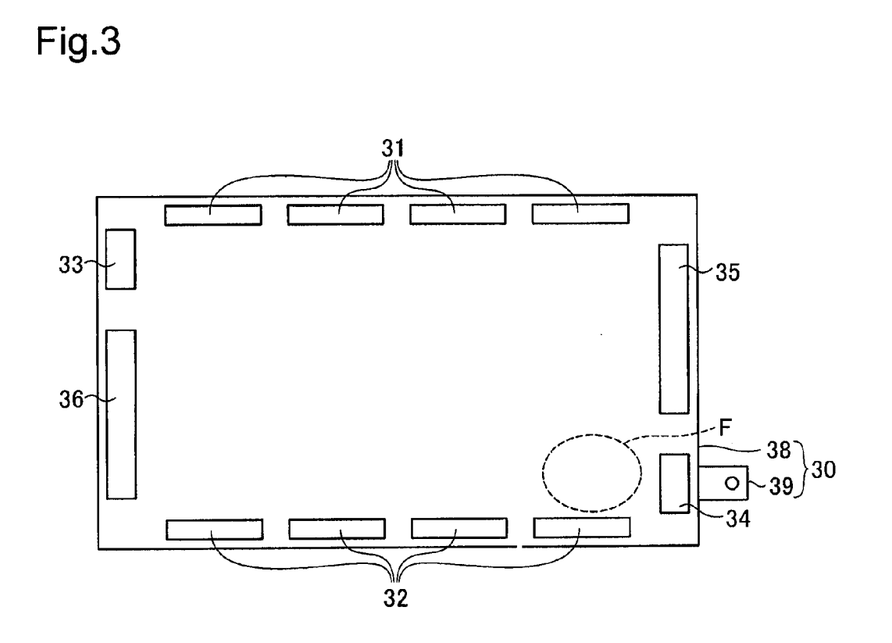
FIG. 3 is a plan view showing the schematic planar structure of the anode side collector plate.

FIG. 3 is a plan view showing the schematic planar structure of the anode side collector plate 30. The anode side collector plate 30 is equipped with a collector unit 38 and an output terminal 39. The collector unit 38 is a flat plate shape forming an approximately rectangular shape with the same outer shape as the outer shape of the single cell 40, and on its circumferential edge part are formed the anode gas supply through hole 33, the anode exhaust gas exhaust through hole 34, the cathode gas supply through hole 31, the cathode exhaust gas exhaust through hole 32, the cooling water supply through hole 35, and the cooling water exhaust through hole 36 which constitute the aforementioned anode gas supply manifold, the anode exhaust gas exhaust manifold, the cathode exhaust gas exhaust manifold, the cathode gas supply manifold, the cooling water supply manifold, and the cooling water exhaust manifold.

The output terminal 39 is electrically connected for example to a secondary cell or an outside load device such as a drive motor or the like for running a vehicle, and is a terminal for outputting electricity generated by the fuel cell stack 100 and supplying it to an outside load. The output terminal 39 is provided in the vicinity of the anode exhaust gas exhaust through hole 34, in the vicinity of the cathode exhaust gas exhaust through hole 32, and in the vicinity of the cooling water supply through hole 35.

The output terminal 39 cross section area is smaller than that of the collector unit 38, so the heat emitting heat volume when outputting electricity generated at the fuel cell stack 100 is greater than that of the collector unit 38. Therefore, with the anode side collector plate of this embodiment, within the plane of the collector unit 38, the temperature in the vicinity of the output terminal 39 becomes higher than in other areas.

With this embodiment, the output terminal 59 of the cathode side collector plate 50 is also provided at the same location as the anode side collector plate 30.

A2. Effect of the Embodiment

Figure 4:
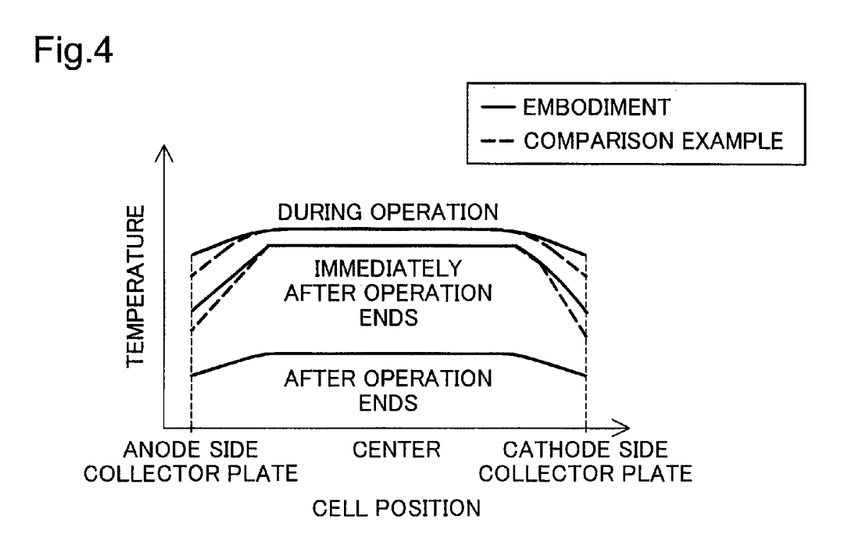
FIG. 4 is a graph showing the relationship between the cell position and temperature with the fuel cell stack.
Figure 5:
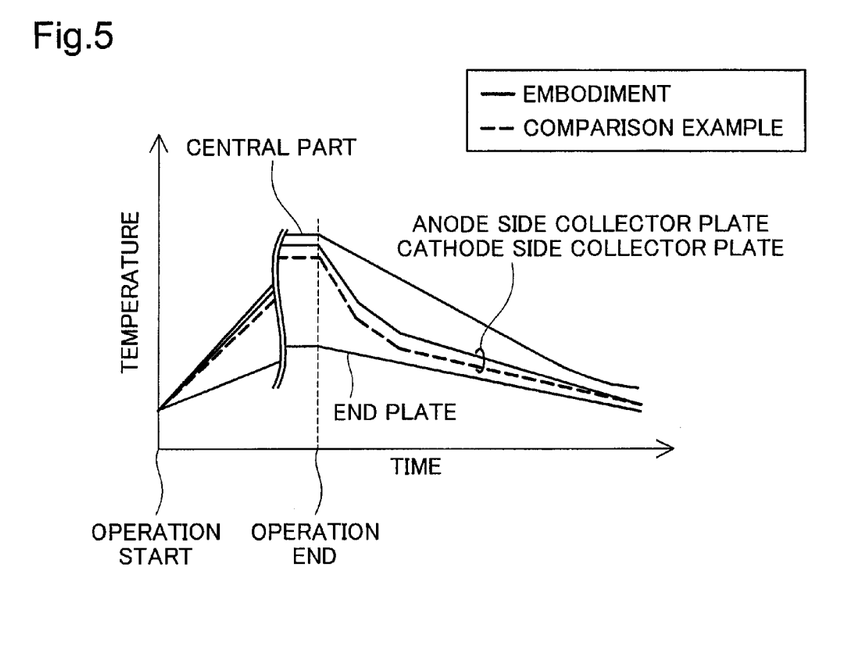
FIG. 5 is a graph showing the changes over time in the temperature of the fuel cell stack.

We will compare the effect of this embodiment with a comparison example and describe it based on FIGS. 4 and 5.

With the fuel cell stack 100 of this embodiment, the output terminal 39 of the anode side collector plate 30 is provided near the anode exhaust gas exhaust through hole 34, in contrast to which, with the fuel cell stack of the comparison example, the output terminal of the anode side collector plate is provided near the anode gas supply through hole 33. Specifically, the output terminal 39 of this embodiment is arranged in the vicinity of the area F shown surrounded by dotted lines in FIG. 3, in contrast to which the output terminal of the comparison example is not arranged in the vicinity of the area F. The fuel cell stack of the comparison example has the same constitution as the constitution of the fuel cell stack 100 of this embodiment except for the fact the output terminal arrangement differs from that of the fuel cell stack 100 of the present invention.

FIG. 4 is a graph showing the relationship between the cell position and temperature with the fuel cell stack. FIG. 5 is a graph showing the changes over time in the temperature of the fuel cell stack. The temperature is measured in the area corresponding to the area F for all the single cells and the collector plate. In FIGS. 4 and 5, the temperature changes with the fuel cell stack 100 of this embodiment are shown with a solid line, and the temperature changes with the fuel cell stack of the comparison example are shown with a dotted line.

During operation and immediately after operation of the fuel cell stack 100 of this embodiment, the area F temperature with the anode side collector plate 30 and the cathode side collector plate 50 is higher than that of the comparison example, and the single cell temperature near the end part of the stacked body is high (FIGS. 4 and 5). Because of that, with the fuel cell stack 100 of this embodiment, it is possible to suppress flooding more than with the comparison example.

Typically, with the fuel cell stack, it is easy for water (including water vapor and liquid water) to pool near the anode exhaust gas exhaust through hole, the cathode exhaust gas exhaust through hole, and the cooling water supply through hole. Specifically, it is easy for water to pool in the area corresponding to the area F on the inside of the single cell. With the fuel cell stack 100 of this embodiment, it is thought that flooding is effectively suppressed because the output terminal 39 is provided near the area F at which water pools easily (FIG. 3).

Also, with the fuel cell stack 100 of this embodiment, it is possible to suppress degradation of the catalyst at the anode of the single cell 40 arranged near the anode side collector plate 30. The reason for this is thought to be as follows.

When flooding occurs at the anode side of the single cell 40, hydrogen is not supplied to the part at which flooding has occurred, so a reaction ($C+2H_2O \rightarrow CO_2+4H^++4e^-$) that generates a proton from the carbon in the catalyst and water occurs, and there is the risk that the catalyst will degrade. Typically, with the fuel cell stack, with the single cells near the anode side collector plate, since the anode side is lower temperature than the cathode side (FIG. 4), water moves from the cathode side to the anode side, and flooding occurs at the anode side. With the single cells near the cathode side collector plate, flooding does not occur easily at the anode side.

With the fuel cell stack 100 of this embodiment, by providing the output terminal 39 of the anode side conductor plate 30 near the area F, the temperature of the area F of the anode side collector plate 30 rises more than with the comparison example, and the temperature difference between electrodes with the single cells near the anode side collector plate 30 is smaller than with the comparison example (FIGS. 4 and 5). As a result, with the single cells near the anode side collector plate 30, movement of water from the cathode side to the anode side is suppressed, and flooding at the anode side is suppressed. Therefore, it is possible to suppress degradation of the catalyst due to lack of hydrogen at the anode side.

Note that with the fuel cell stack 100, there is a great deal of water at the cathode side with the single cells near the cathode side collector plate 50. When flooding occurs at the cathode side, air is not supplied, so there is the risk that the cell voltage will decrease. In contrast to this, with this embodiment, even with the cathode side collector plate 50, the output terminal 59 is provided in the vicinity of the area for which flooding occurs easily, so flooding is prevented at the cathode side, and it is possible to suppress a decrease in the cell voltage.

Furthermore, with the fuel cell stack 100 of this embodiment, it is possible to suppress flooding without providing a heating means such as a heater or the like, so it is possible to suppress flooding while suppressing an increase in size of the fuel cell stack. Also, for example when using a constitution for which a heater is provided, power is required to drive the heater and the control device for controlling the heater, and there is the problem that the use efficiency of the power generated with the fuel cell stack decreases. On the other hand, with the fuel cell stack 100 of this embodiment, compared to when a heater is provided, it is possible to increase the use efficiency of the power generated by the fuel cell stack.

B. Second Embodiment

Figure 6A:
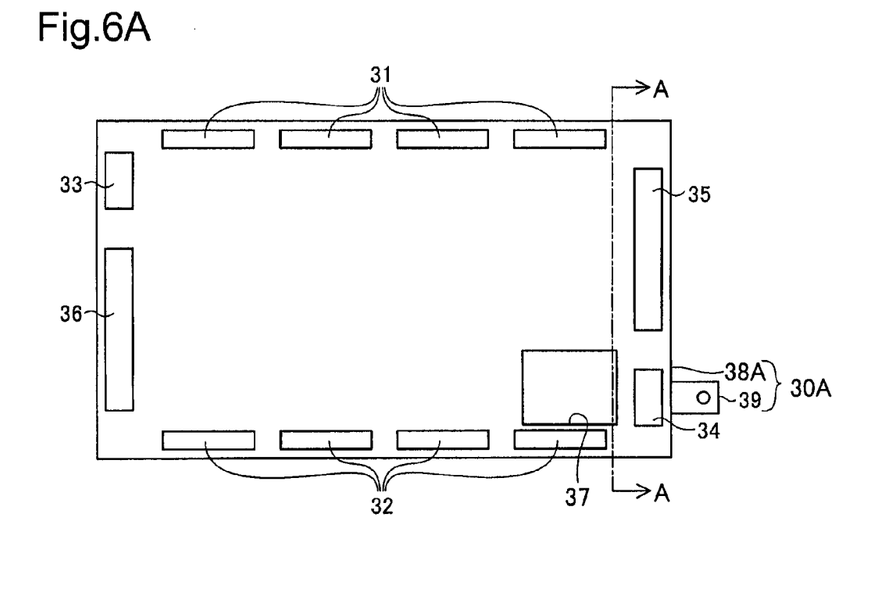
FIG. 6 is a drawing schematically showing the anode side collector plate of a second embodiment.
Figure 6B:
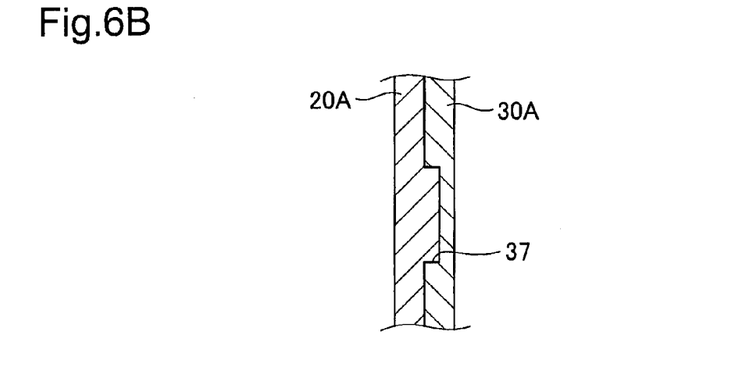

The fuel cell stack of the second embodiment is the same as the first embodiment except for the constitution of the anode side conductor plate, so we will describe the anode side conductor plate, and omit a description of the remainder of the constitution. FIG. 6 is a drawing schematically showing the anode side collector plate of the second embodiment. FIG. 6 (a) is a plan view, and (b) is a cross section view showing the A-A cross section in (a).

The anode side conductor plate 30A, the same as with the anode side conductor plate 30 with the first embodiment, is equipped with a collector unit 38A and the output terminal 39. The collector unit 38A with this embodiment forms an outer shape that is approximately rectangular the same as with the collector unit 38 of the first embodiment, and the cathode gas supply through hole 31, the cathode exhaust gas exhaust through hole 32, the anode gas supply through hole 33, the anode exhaust gas exhaust through hole 34, the cooling water supply through hole 35, and the cooling water exhaust through hole 36 are arranged in the same way as with the first embodiment. Also, the output terminal 39 is arranged in the same position as with the first embodiment.

The difference between the collector unit 38A of this embodiment and the collector unit 38 of the first embodiment is the point that a high electrical resistance area 37 is provided in the vicinity of the output terminal 39. As shown in FIG. 6 (B), the high electrical resistance area 37 has a thinner plate thickness than the remaining area. The electrical resistance is inversely proportional to the cross section area. Therefore, with the collector unit 38A, the electrical resistance per unit of length of the high electrical resistance area 37 is greater than that of the remaining area. Therefore, when the electricity generated by the fuel cell stack is fetched via the output terminal 39, the heat volume generated by the electricity that flows in the high electrical resistance area 37 is greater than that of the remaining area. Therefore, it is possible to further heat the area for which flooding occurs easily, making it possible to suppress the occurrence of flooding.

Note that with the fuel cell stack of this embodiment, the area facing opposite the high electrical resistance area 37 of the insulation plate 20A is formed in a projecting state so as to engage with the high electrical resistance area 37 (FIG. 6 (B)). By arranging in this way, it is possible to suppress the decrease in pressing force in the stacking direction of the fuel cell stack at the high electrical resistance area 37.

C. Modifications

Note that this invention is not limited to the embodiments noted above, and it is possible to implement various modes in a scope that does not stray from its gist, with the following modifications possible, for example.

C1. Modification 1:

The arrangement of the output terminal 39 at the anode side collector plate 30 is not limited to the aforementioned embodiments, and is acceptable as long as it is provided in the vicinity of at least one of the anode exhaust gas exhaust hole, the cathode exhaust gas exhaust hole, and the cooling medium supply hole. For example, it is also possible to arrange as with modifications 1 and 2 noted below.

Figure 7:
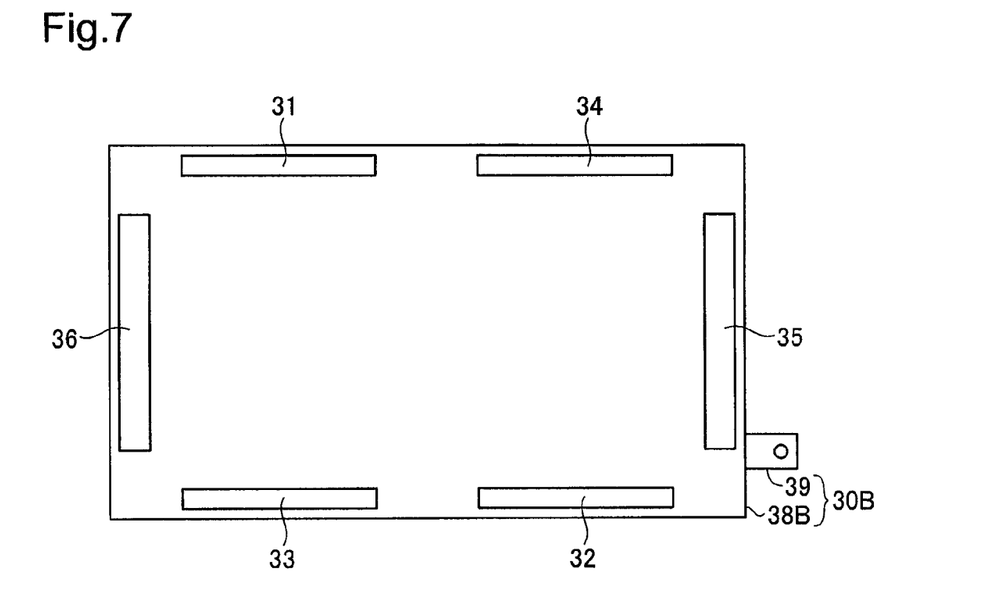
FIG. 7 is a plan view showing the schematic structure of the anode side collector plate of modification 1.

FIG. 7 is a plan view showing the schematic structure of the anode side collector plate 30B of modification 1. The anode side collector plate 30B is equipped with a collector unit 38B and the output terminal 39. The collector unit 38B of modification 1 differs from the collector unit 38 of the first embodiment in the arrangement of the cathode gas supply through hole 31, the cathode exhaust gas exhaust through hole 32, the anode gas supply through hole 33, the anode exhaust gas exhaust through hole 34, and the cooling water supply through hole 35. The output terminal 39 is provided in the vicinity of the cooling water supply through hole 35 and the cathode exhaust gas exhaust through hole 32. Even with this arrangement, it is possible to heat the vicinity of the cooling water supply through hole 35 and the cathode exhaust gas exhaust through hole 32 at which flooding occurs easily, so it is possible to suppress the occurrence of flooding.

Figure 8:
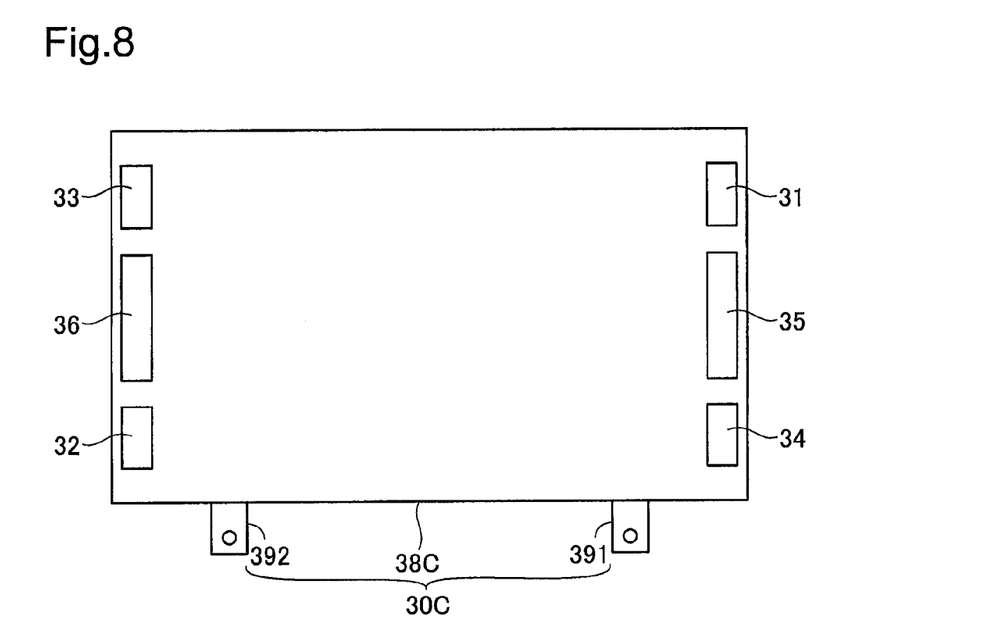
FIG. 8 is a plan view showing the schematic structure of the anode side collector plate of modification 2.

FIG. 8 is a plan view showing the schematic structure of the anode side collector plate 30C of modification 2. The anode side collector plate 30C is equipped with a collector unit 38C and output terminals 391 and 392. The collector unit 38C of modification 2 differs from the collector unit 38 of the first embodiment in its arrangement of the cathode gas supply through hole 31, the cathode exhaust gas exhaust through hole 32, the anode gas supply through hole 33, the anode exhaust gas exhaust through hole 34, and the cooling water supply through hole 35. The output terminal 391 is provided in the vicinity of the anode exhaust gas exhaust through hole 34, and the output terminal 392 is provided in the vicinity of the cathode exhaust gas exhaust through hole 32. Even arranged in this way, it is possible to use the heat emission at the output terminals 391 and 392 to heat the vicinity of the anode exhaust gas exhaust through hole 34 and the cathode exhaust gas exhaust through hole 32 for which flooding occurs easily, so it is possible to suppress the occurrence of flooding.

C2. Modification 2:

With the aforementioned embodiments, with the cathode side collector plate 50, the output terminal 59 is provided at a position facing opposite the position of the output terminal 39 of the anode side collector plate 30. The position of the output terminal 59 of the cathode side collector plate 50 can also be a position that does not correspond to the position of the output terminal 39. For example, it is possible to provide it in the vicinity of the anode gas supply through hole 33. Even when arranged in this way, it is possible to suppress flooding at the anode side of the single cell 40 arranged near the anode side collector plate 30, so it is possible to suppress degradation of the catalyst.

C3. Modification 3:

With the aforementioned second embodiment, by making the plate thickness at the high electrical resistance area 37 thinner than the remaining area, the electrical resistance per unit of length is greater. It is also possible to make the electrical resistance per unit of length of the high electrical resistance area 3y greater using another method. For example, it is also possible to use a material with a specific resistance (electrical resistivity) greater than that of the remaining area for the high electrical resistance area 37. Even when arranged in this way, it is possible to suppress the occurrence of flooding by heating the area for which flooding occurs easily.

C4. Modification 4:

With the aforementioned embodiments, it is also possible to have the width of the output terminal 39 of the anode side collector plate 30 be narrower than the width of the output terminal 59 of the cathode side collector plate 50. When arranged in this way, the electrical resistance with the output terminal 39 of the anode side collector 30 is greater than the electrical resistance with the output terminal 59 of the cathode side collector plate 50. Because of that, the temperature in the vicinity of the output terminal 39 of the anode side collector plate 30 is higher than the temperature in the vicinity of the output terminal 59 of the cathode side collector 50. As a result, with the fuel cell stack 100, in particular, it is possible to suppress anode side flooding with the single cells near the end part of the anode side, making it possible to suppress degradation of the catalyst.

DESCRIPTION OF PARTS

10 End plate
20, 20A Insulation plate
30, 30A, 30B, 30C Anode side collector plate
31 Cathode gas supply through hole
32 Cathode exhaust gas exhaust through hole
33 Anode gas supply through hole
34 Anode exhaust gas exhaust through hole
35 Cooling water supply through hole
36 Cooling water exhaust through hole
37 High electrical resistance area
38, 38A, 38B, 38C Collector unit
39, 391, 392, 59 Output terminal
40 Single cell
42 Sealing member single unit type MEA
44 Anode side separator
46 Cathode side separator
50 Cathode side collector plate
60 Insulation plate
70 End plate
100 Fuel cell stack
400 Stacked body
421 MEA
422 Sealing member
423 Electrolytic membrane
424 Anode
425 Anode side diffusion layer
426 Cathode

427 Cathode side diffusion layer
441 Anode gas flow path
442 Cooling water flow path
461 Cathode gas flow path

What is claimed is:

1. A fuel cell stack comprising:
a stacked body constituted by stacking a plurality of power generating elements, which contain an electrolytic membrane and electrocatalytic layers arranged respectively at the anode side and the cathode side of the electrolytic membrane, via a separator for providing a flow path for supplying reaction gas to the electrocatalytic layer, and
collector plates arranged at both ends of the stacked body, for collecting electricity generated by the stacked body and outputting it to the outside, wherein
on the separator and the collector plate are formed an anode gas supply hole for supplying reaction gas to the anode, a cathode gas supply hole for supplying reaction gas to the cathode, an anode exhaust gas exhaust hole for exhausting anode exhaust gas, a cathode exhaust gas exhaust hole for exhausting cathode exhaust gas, a medium supply hole for supplying into the stacked body a medium for maintaining the temperature of the stacked body at an approximately fixed level, and a medium exhaust hole for exhausting the medium from the stacked body,
and at the anode side collector plate arranged at the anode side end of the stacked body,
an output terminal for outputting at least part of the collected electricity to the outside is provided at a position closer to the anode exhaust gas exhaust hole, the cathode exhaust gas exhaust hole, and the medium supply hole than the anode gas supply hole, the cathode gas supply hole, and the medium exhaust hole.

2. A fuel cell stack according to claim 1 wherein
the anode side collector plate has a high electrical resistance area for which the electrical resistance per unit of length at a specified position of the output terminal side is in part greater than that of the remaining part.

3. A fuel cell stack according to claim 2 wherein
with the high electrical resistance area, by forming the plate thickness of the anode side collector plate to be in part thinner than the remaining part, the electrical resistance per unit of length becomes greater.

\* \* \* \* \*